(12) United States Patent
Choi

(10) Patent No.: US 6,689,502 B2
(45) Date of Patent: Feb. 10, 2004

(54) MONOPOLAR CELL PACK OF DIRECT METHANOL FUEL CELL

(75) Inventor: Kyoung-hwan Choi, Kyngiki-do (KR)

(73) Assignee: Samsung Electronics Co., Ltd. (KR)

( * ) Notice: Subject to any disclaimer, the term of this patent is extended or adjusted under 35 U.S.C. 154(b) by 254 days.

(21) Appl. No.: 09/683,123

(22) Filed: Nov. 21, 2001

(65) Prior Publication Data

US 2002/0132151 A1 Sep. 19, 2002

(30) Foreign Application Priority Data

Mar. 16, 2001 (KR) ........................................ 2001-13673
Aug. 28, 2001 (KR) ........................................ 2001-52113

(51) Int. Cl.$^7$ ............................ H01M 8/10; H01M 8/24
(52) U.S. Cl. ........................................... 429/32; 429/34
(58) Field of Search ............................ 429/18, 20, 32, 429/34, 38–40, 160, 162, 210

(56) References Cited

U.S. PATENT DOCUMENTS

| | | | |
|---|---|---|---|
| 5,686,197 A | * 11/1997 | Nishida et al. | ............... 429/30 |
| 5,925,477 A | 7/1999 | Ledjeff et al. | |
| 5,989,741 A | * 11/1999 | Bloomfield et al. | .......... 429/32 |
| 2002/0150804 A1 | * 10/2002 | Srinivasan et al. | ........... 429/32 |

* cited by examiner

*Primary Examiner*—Susy Tsang-foster
(74) *Attorney, Agent, or Firm*—Burns, Doane, Swecker & Mathis, LLP

(57) ABSTRACT

A monopolar cell pack for a direct methanol fuel cell is provided. In the monopolar cell pack, series-connection of electrodes makes it unnecessary for connections to pass through an electrolyte membrane and allows single cells to be electrically connected on the first and second surfaces of the ion exchange membrane, respectively, thereby preventing leakage of fuel. As a result, the internal electric circuit according to the present invention can be simplified. Also, since current collectors contact the anodes and cathodes entirely rather than partially, contact resistance can be considerably reduced, thereby greatly reducing a loss due to resistance. Carbon dioxide, which is a byproduct of the reaction, can be easily exhausted through an exhaust path installed in each current collector, thereby improving performance of a cell pack.

36 Claims, 13 Drawing Sheets

MONOPOLAR CELL PACK OF DIRECT METHANOL FUEL CELL

BACKGROUND OF INVENTION

1. Field of the Invention

The present invention relates to a cell pack of a direct methanol fuel cell, and more particularly, to a cell pack of a direct methanol fuel cell in which a circuit connecting cells is simplified and which can effectively exhaust byproducts.

2. Description of the Related Art

A direct methanol fuel cell (DMFC), which is a source of future clean energy that can replace fossil energy, has high power density and high energy conversion efficiency. Also, the DMFC can be operated at room temperature and can be made light-weight and miniaturized. Thus, the DMFC has very wide applications including zero-emission vehicles, home generator systems, mobile communications equipment, medical appliances, military equipment and space industry equipment.

DMFCs produce electricity by electrochemical reaction between methanol and oxygen. A unit battery of such DMFCs, that is, a cell, as shown in FIG. 1, is constructed such that a proton exchange membrane 1 is interposed between an anode 2 and a cathode 3. The proton exchange membrane 1 has a thickness of 50 to 200 μm and is made of solid polymer electrolyte. Both of the anode 2 and cathode 3 of such a cell include a support layer for supply and diffusion of fuel and a catalyst layer at which oxidation/reduction of fuel occur.

Carbon paper or carbon cloth is used as the support layers of the anode 2 and the cathode 3 and the support layers are waterproof for supply of methanol as liquid fuel and easy exhaustion of water that is a reaction product.

In the anode 2, methanol, ethanol or isopropyl alcohol and water are reacted to produce protons, electrons and carbon dioxide (oxidation). The produced protons are transferred to the cathode 3 through the proton exchange membrane 1. In the cathode 3, the protons and oxygen are reacted to produce water (reduction).

The following reaction equations 1 and 2 represent reactions occurring in the anode and cathode and the reaction equation 3 represents an overall reaction occurring in the single cell.

$$CH_3OH+H_2O \rightarrow CO_2+6H^++6e^- \quad \text{[Reaction equation 1]}$$

$$\tfrac{3}{2}O_2+6H^++6e^- \rightarrow 3H_2O \quad \text{[Reaction equation 2]}$$

$$CH_3OH+3/2O_2 \rightarrow H_2O+CO_2 \quad \text{[Reaction equation 3]}$$

A theoretical voltage generated in a single cell is approximately 1.2 V. Thus, in order to generate a high voltage, several single cells are stacked and electrically connected in series. Here, as many flow fields and bipolar plates as stacked cells are required for supplying each single cell with fuel and air and to collect generated electricity. Although metal mesh may be typically used as the flow fields, flow fields may be grooved on a graphite block having electrical conductivity, capable of hermetically sealing gas and having a predetermined thickness.

However, in such a case, in order to supply fuel and oxygen continuously throughout stacked cells from the outermost single cell to the innermost single cell without being mixed, the design of a complicated flow field is necessary. For this reason, liquid or gas supplied to the cells is prone to leakage. Also, since many graphite blocks are stacked, hermetic sealing and reduction in size and weight of the stack are difficult to realize, affecting power density. Also, since internal resistance, temperature and humidity of the outermost and innermost parts of the stack are not uniform, single cells are partially subjected to high load, resulting in shortened life of the stack. In spite of such drawbacks, the conventional stack is advantageously adopted for small power density. However, for attainment of low power density, a monopolar cell pack structure overcoming such drawbacks is advantageously adopted.

A conventional monopolar cell pack is constructed such that anodes 2a are disposed at one side of an ion exchange membrane 1a and cathodes 3a corresponding to the anodes 2a are disposed at the opposite side, as shown in FIGS. 2A and 2B. In order to electrically series-connect the respective cells, a connection wire 4 connecting the anode 2a and cathode 3a of neighboring cells must pass through the ion exchange membrane 1a between the anode 2a and the cathode 3a. In this case, a path or hole for passage of the connection wire 4 must be provided in the ion exchange membrane 1a. However, since the path or hole is likely to cause leakage of fuel, a path or hole portion should be sealed. If the connection wire 4 does not pass through the ion exchange membrane 1a, the connection wire 4 must be re-routed outside the cell pack.

As described above, if a connection wire is re-routed outside a cell pack, the length of the connection wire necessarily becomes longer causing a current loss due to an increase in line resistance, resulting in leakage of fuel. Thus, it is necessary to seal a connection wire portion. In the conventional cell pack, since the contact between the current collector and anode or cathode electrode is bad and a contact area is not wide, a current loss is generated due to contact resistance. Another drawback encountered with the conventional cell pack is in that a supply of fuel is hindered by $CO_2$ gas because there is no exhaust path for byproducts, that is, the $CO_2$ gas, resulting in deteriorated activity of electrodes.

FIG. 3 is a schematic diagram of a conventional cell pack 10 disclosed in U.S. Pat. No. 5,925,477.

Referring to FIG. 3, in a state in which some parts of single cells are disposed in a row so as to overlap with neighboring cells, cathodes 13 and 13a of the respective cells are electrically connected in series to an anode 12a of a cell next thereto by current collectors 14 and 14a. According to this structure, flow fields for supplying fuel must be formed on a graphite plate and a fuel path from the outside of cells must be separately provided for a fuel flow among electrodes. Also, since electrodes where electrochemical reactions occur, that is, anodes and cathodes, should be bent, the service life of electrodes is shortened and the manufacturing process thereof is complex.

SUMMARY OF INVENTION

To solve the above-described problems, it is a first object of the present invention to provide a monopolar cell pack for a direct methanol fuel cell having a simplified electrical connection structure among cells.

It is a second object of the present invention to provide a monopolar cell pack for a direct methanol fuel cell in which fuel leakage of a cell can be effectively suppressed.

It is a third object of the present invention to provide a monopolar cell pack for a direct methanol fuel cell in which gas generated in a cell can be effectively exhausted.

To achieve the first object of the present invention, there is provided a monopolar cell pack for a direct methanol fuel cell including an upper plate and a lower plate spaced a predetermined distance apart from each other, an ion exchange membrane provided between the upper plate and the lower plate, having a first surface and a second surface corresponding to the first surface and having a plurality of single cell regions on the first and second surfaces, a plurality of first anodes installed in each single cell region on the first surface of the ion exchange membrane and a plurality of first cathodes disposed in each single cell region adjacent to each of the anodes, a plurality of second cathodes installed in each single cell region on the second surface of the ion exchange membrane corresponding to the first anodes, and a plurality of second anodes corresponding to the first cathodes, first and second anode current collectors installed on the first and second anodes and each having a fuel passage region, first and second cathode current collectors installed on the first and second cathodes and each having an air passage region, a plurality of first conductive portions electrically connecting the first anode and cathode adjacent to each other on the first surface of the ion exchange membrane, and a plurality of second conductive portions electrically connecting the second anode and cathode adjacent to each other on the second surface of the ion exchange membrane to electrically connect in series cells provided in the single cell regions.

Preferably, fuel supply regions for supplying fuel to the first and second anodes, and air supply regions for supplying air to the first and second cathodes, are provided on the upper and lower plates.

Also, the first and second anode current collectors corresponding to the first and second anodes and cathodes may have a size corresponding to that of each of the fuel supply regions provided on the upper and lower plates, and the first and second cathode current collectors may have a size corresponding to that of each of the air supply regions provided on the upper and lower plates.

The first conductive portion is preferably integrally formed with each of the first anodes disposed on the first surface of the ion exchange membrane and the first cathode electrically connected thereto. The second conductive portion is preferably integrally formed with each of the second anode disposed on the second surface of the ion exchange membrane and the second cathode electrically connected thereto.

Preferably, current collector insertion grooves into which first current collectors are inserted are formed on the inner surface of the upper plate. Current collector insertion groove and conductive portion insertion groove into which the second anode current collectors, the second cathode current collectors, and the second conductive portion connecting these current collectors are inserted, are formed on the inner surface of the lower plate.

A plurality of first gas exhaust channels for exhausting byproducts generated at the first and second anodes are preferably formed on the inner surfaces of the first and second anode current collectors, and a plurality of second gas exhaust channels connected to the first gas exhaust channels are preferably formed on the inner surfaces of the upper and lower plates.

BRIEF DESCRIPTION OF DRAWINGS

The above objects and advantages of the present invention will become more apparent by describing in detail preferred embodiments thereof with reference to the attached drawings in which.

DETAILED DESCRIPTION

A monopolar cell pack for a DMFC according to a preferred embodiment of the present invention will now be described in more detail with reference to the accompanying drawings.

Figure 1:
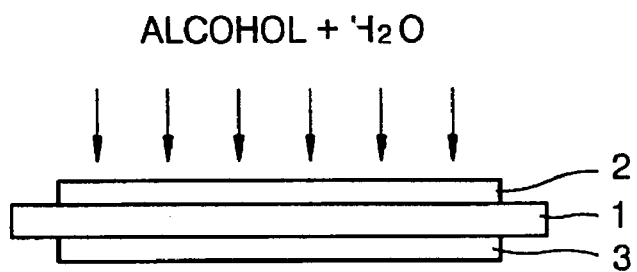
FIG. 1 is a diagram showing the basic structure of a direct methanol fuel cell (DMFC)
Figure 2A:
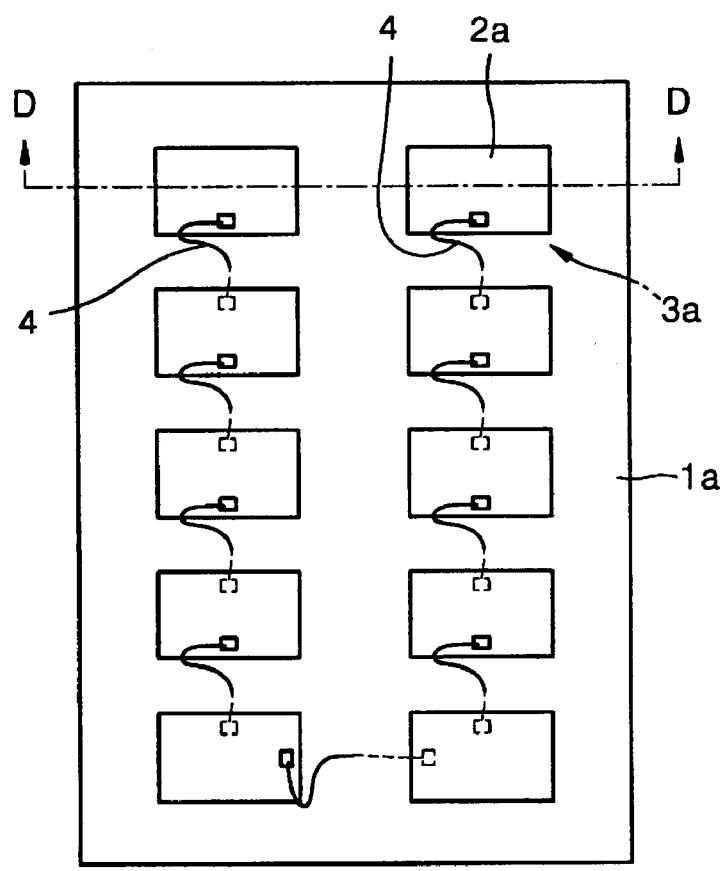
FIG. 2A is a plan view showing an electrical connection structure among single cells in a conventional monopolar fuel cell.
Figure 2B:
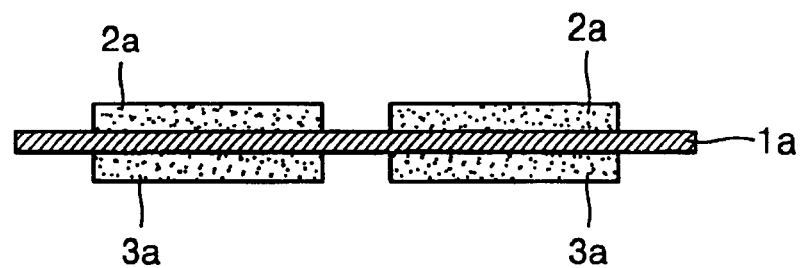
FIG. 2B is a sectional view of the structure shown in FIG. 2A, taken along the line D—D.
Figure 3:
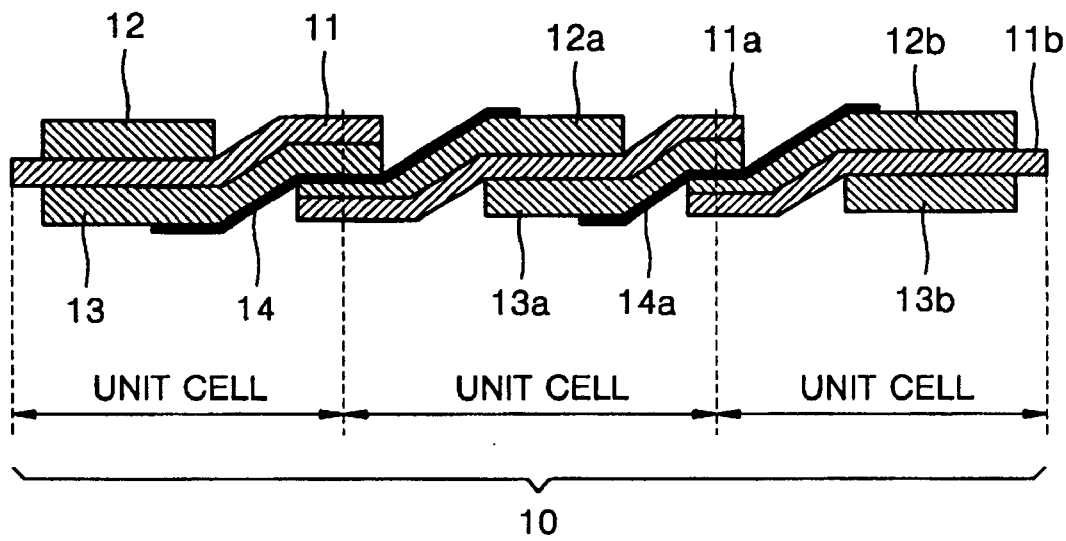
FIG. 3 is a schematic diagram showing an example of a conventional monopolar cell pack.
Figure 4:
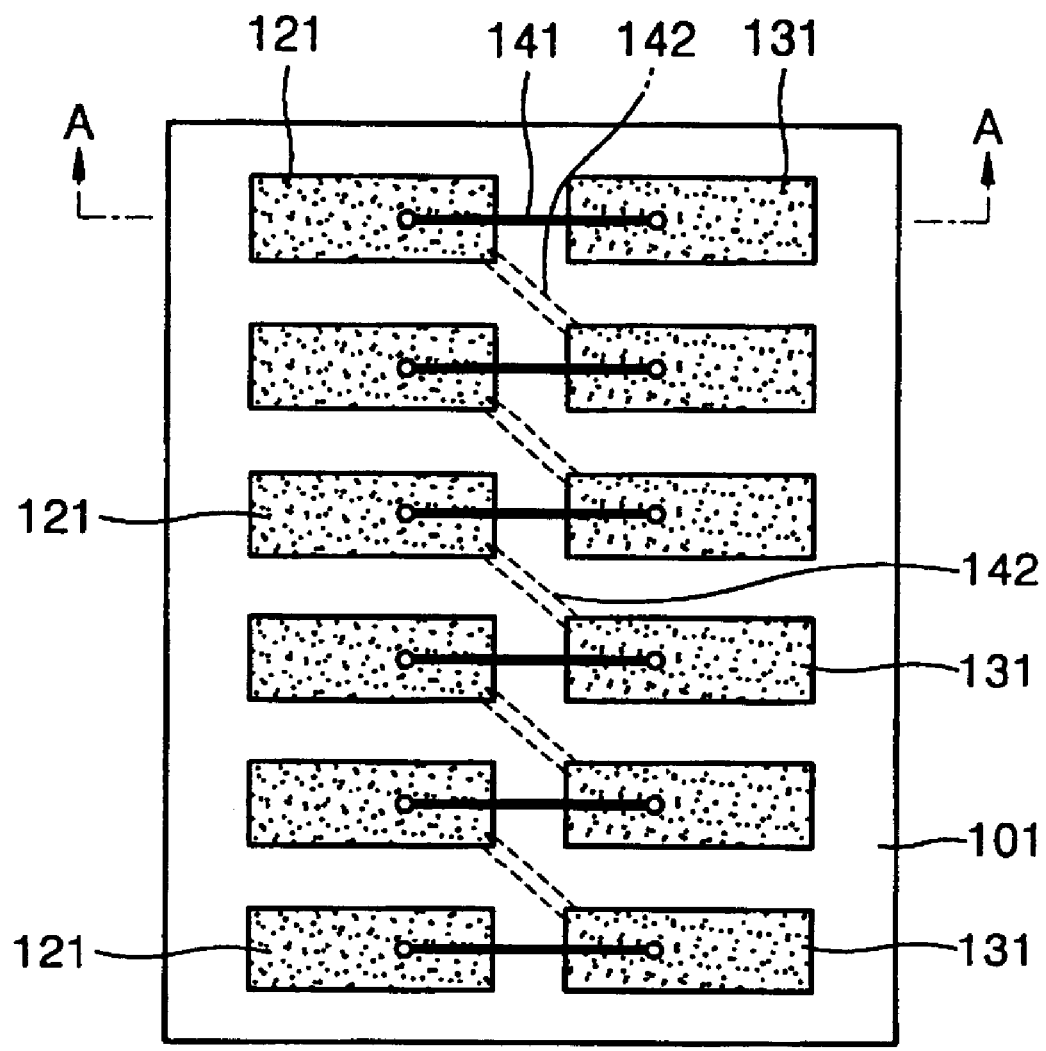
FIG. 4 is a conceptual plan view showing an electrical connection structure among single cells in a monopolar fuel cell for a DMFC according to the present invention.
Figure 5:
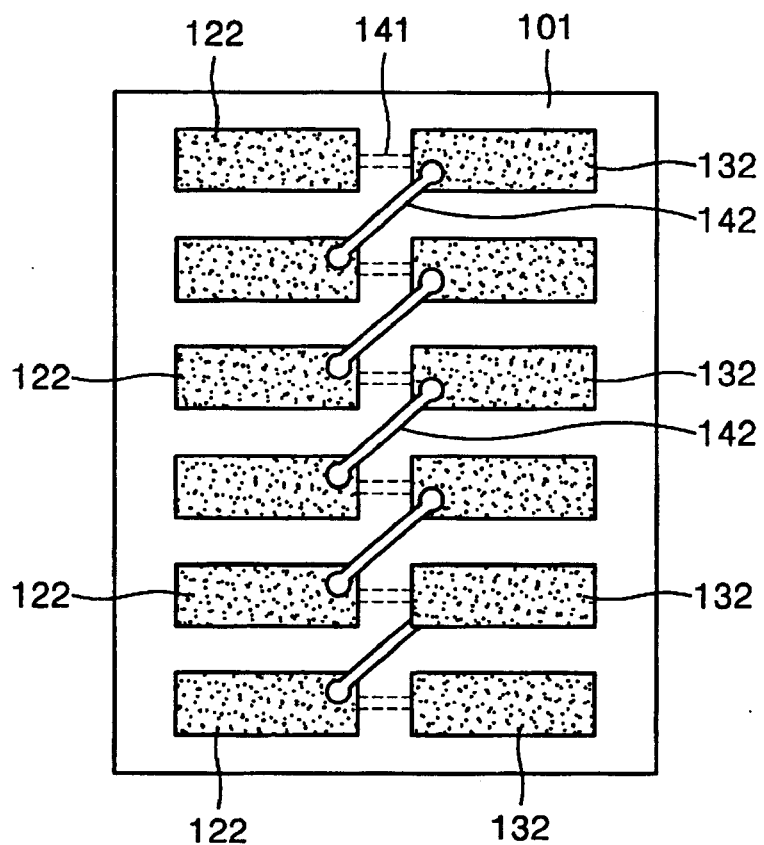
FIG. 5 is a conceptual bottom view showing an electrical connection structure among single cells in a monopolar fuel cell for a DMFC according to the present invention.
Figure 6:
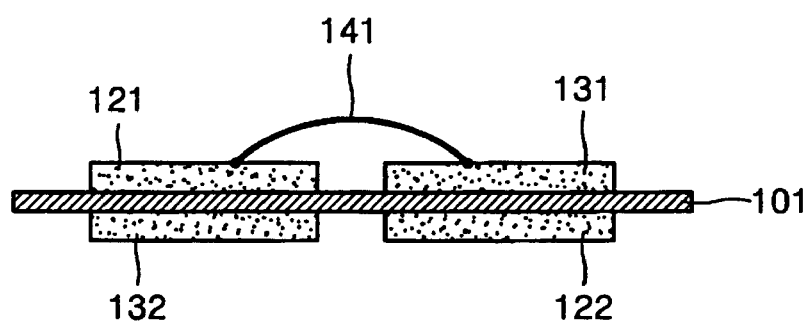
FIG. 6 is a sectional view of the structure shown in FIG. 4, taken along the line AA.

FIGS. 4 and 5 are a conceptual plan view and a conceptual bottom view showing an electrical connection structure among single cells in a monopolar fuel cell for a DMFC according to the present invention, and FIG. 6 is a sectional view of the structure shown in FIG. 4, taken along the line A—A.

Referring to FIG. 4, a plurality of first anodes 121 are disposed in a row on a first surface, that is, a top face of an ion exchange membrane 101, and a plurality of first cathodes 131 are disposed in a row on the first surface to be parallel with the row of the first anodes 121. That is, the first anodes 121 and the first cathodes 131 are disposed in a single cell area.

Referring to FIG. 5, a plurality of second anodes 122 are disposed in a row on a second surface, that is, a bottom face of the ion exchange membrane 101, and a plurality of second cathodes 132 are disposed in a row on the second surface to be parallel with the row of the second anodes 122.

As shown in FIG. 6, the first anodes 121 disposed on the first surface and the second cathodes 132 disposed on the second surface are vertically aligned in pairs, and the first cathodes 131 disposed on the first surface and the second anodes 122 disposed on the second surface are vertically aligned in pairs.

The first anodes 121 and the second cathodes 132 corresponding thereto, and the first cathodes 131 and the second anodes 122 corresponding thereto, constitute a single cell together with parts of the ion exchange membrane 101.

As shown in FIGS. 4 and 6, on the first surface of the ion exchange membrane 101, each of the first anodes 121 is electrically connected with the first cathode 131 directly across from it through a first conductive portion 141. As shown in FIG. 5, on the second surface of the ion exchange membrane 101, each of the respective second anodes 122 is electrically connected with the second cathode 132 diagonally across from it through a second conductive portion 142.

According to such an electrical connection structure, cells in the single cell area are electrically connected in series to each other. In other words, the anodes 121 and 122 and the cathodes 131 and 132 are connected in series by a zigzag connection structure through the first and second conductive portions 141 and 142 positioned on the first and second surfaces of the ion exchange membrane 101. Here, the first and second conductive portions 141 and 142 are positioned on the first and second surfaces of the ion exchange membrane 101, respectively, unlike in the prior art in which an ion exchange membrane must be passed through by a path or hole. This arrangement can be attained by distributing the first anodes and the first cathode on the first surface and by distributing the second anodes and the second cathodes on the second surface.

In FIGS. 4 through 6, current collectors contacting the respective anodes and cathodes are not shown. In practice, current collectors to be described later are installed on the surface of each of the first and second anodes and the first and second cathodes and the first and second conductive portions 141 and 142 are connected to the current collectors, respectively, which will later be described in more detail.

Figure 7:
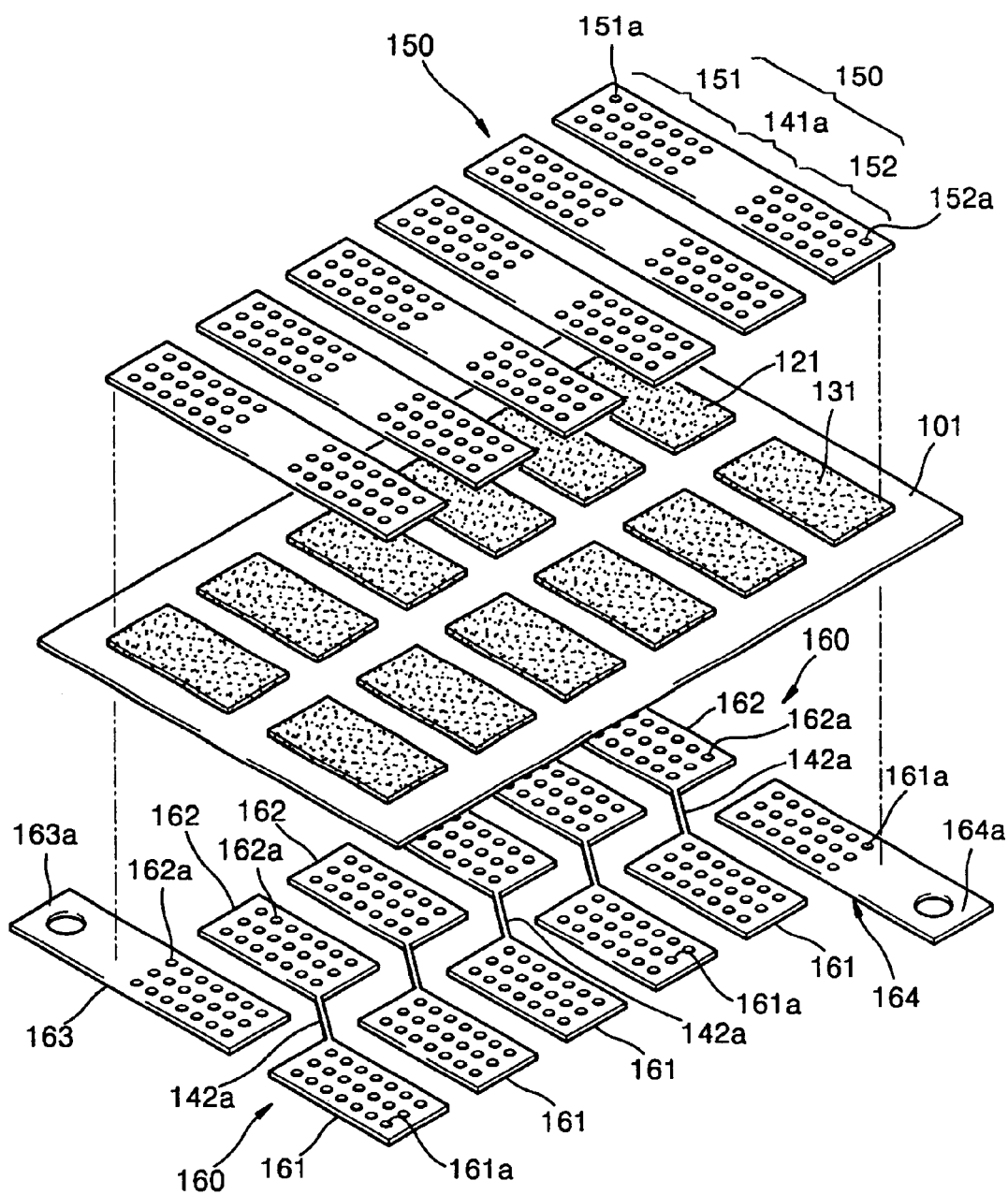
FIG. 7 is a detailed diagram showing a geometric arrangement of major components of a monopolar fuel cell for a DMFC according to the present invention.

FIG. 7 is a detailed diagram showing a geometric arrangement of major components of a monopolar fuel cell for a DMFC according to the present invention.

Referring to FIG. 7, current collecting members 150 and 160 each having an anode current collector and a cathode current collector incorporated therein are disposed on the upper and lower surfaces of the ion exchange membrane 101 having the anodes and cathodes arranged in the above-described manner, that is, the first and second surfaces.

In FIG. 7, the first current collecting member 150 positioned on the upper surface of the ion exchange membrane 101 has a rectangular shape such that a first anode current collector 151 for the first anodes 121, a first cathode current collector 152 for the first cathodes 131 and a first conductive portion 141a disposed therebetween are integrally formed. A plurality of perforated fuel passage regions (to be referred to as fuel passage holes) 111a and a plurality of perforated air passage regions (to be referred to as air passage holes) 152a are formed on the first anode current collector 151 and the first cathode current collector 152, respectively.

The second current collecting member 160 positioned on the lower surface of the ion exchange membrane 101 is constructed such that a second anode current collector 161 for the second anodes 122, a second cathode current collector 162 for the second cathodes 132 and a second conductive portion 142a disposed therebetween are integrally formed. As described above, the second conductive portion 142a electrically connects each second anode current collector 161 with a second cathode current collector 162 in a diagonal direction.

An independent second cathode current collector 163 and an independent second anode current collector 164 contact the second cathode 132 and second anode 122 positioned at both endmost parts of the above-described series-connection structure.

Terminal portions 163a and 164a for electrical connection to the outside extend to ends of the independent second cathode and anode current collectors 163 and 164. A plurality of perforated fuel passage regions 161a are formed in the second anode current collectors 161 and 164 and a plurality of perforated air passage regions 162a are formed in the second cathode current collectors 162 and 163.

The current collecting members 150 and 160 serve as current collectors and fuel or oxygen supply paths. The fuel passage holes 151a and 161a are formed in the first and second anode current collectors 151 and 161 and the air passage holes 152a and 162a are formed in the first and second cathode current collectors 152 and 162. The fuel passage holes 151a and 161a are big enough to exceed surface tension so as for liquid such as methanol to pass therethrough, thereby preventing fuel from collecting on the first and second anode current collectors 151 and 161. Here, the diameters of the fuel passage holes 151a and 161a are preferably 1.5 mm or greater. In the case of the air passage holes 152a and 162a, as many air passage holes as possible are formed so that air sufficiently contacts the cathodes, thereby facilitating electrode reactions.

Figure 8:
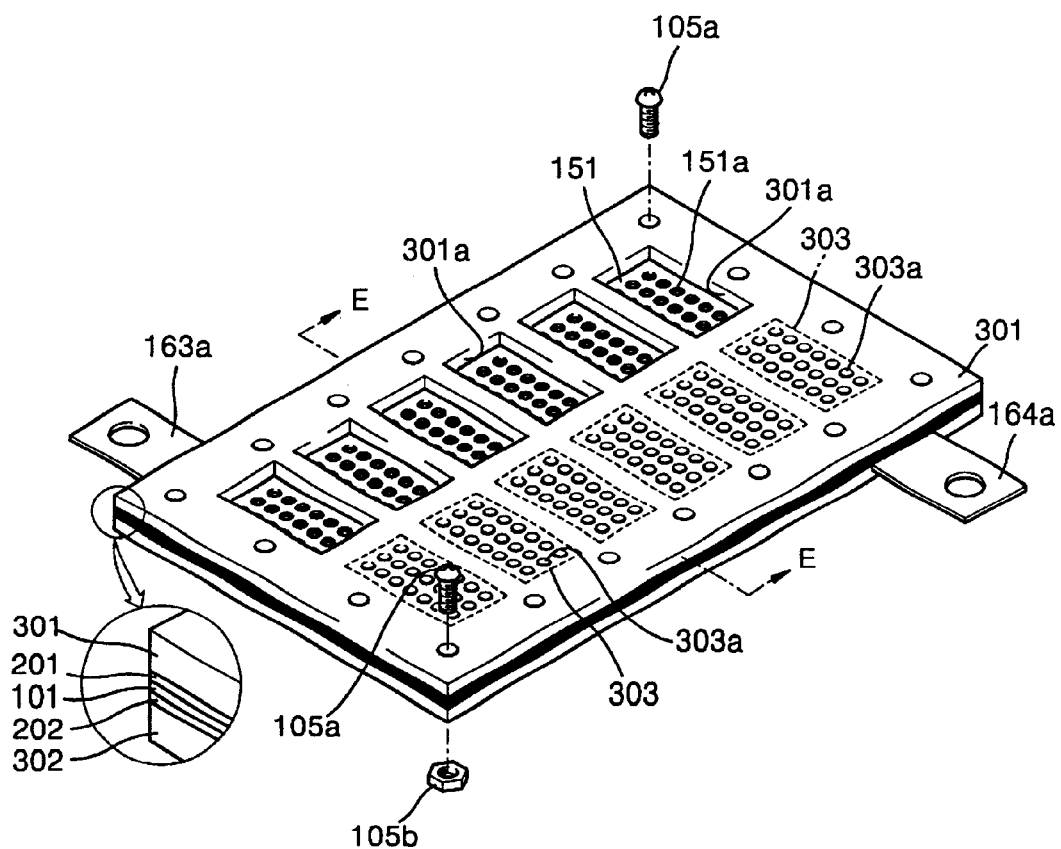
FIG. 8 is a schematic perspective view of a monopolar fuel cell for a DMFC according to the present invention.
Figure 9:
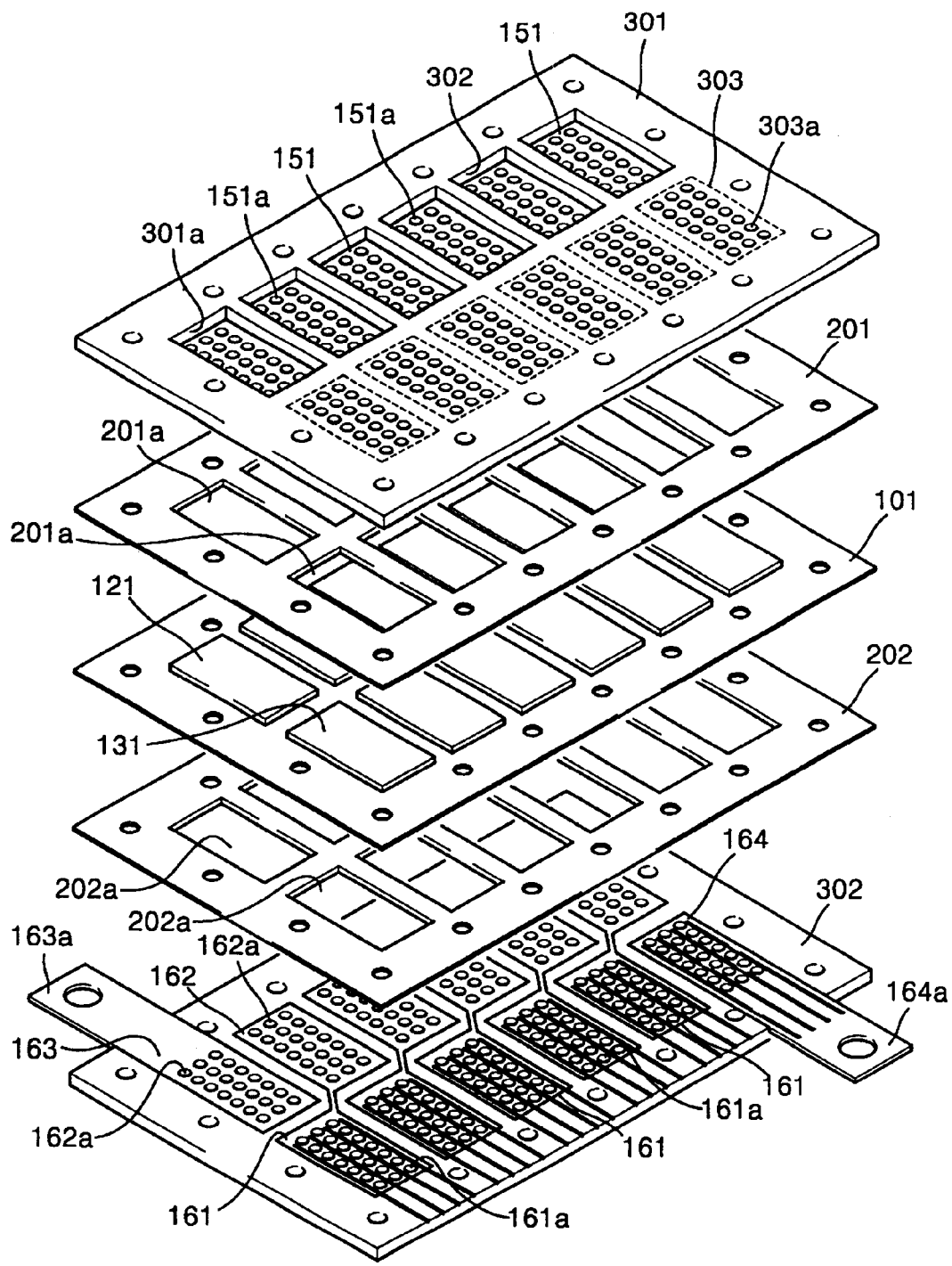
FIG. 9 is an exploded perspective view of the monopolar fuel cell shown in FIG. 8.

FIG. 8 is a schematic perspective view of a monopolar fuel cell for a DMFC according to the present invention and FIG. 9 is an exploded perspective view of the monopolar fuel cell shown in FIG. 8.

An upper gasket 201, an ion exchange membrane 101 and a lower gasket 202 are sequentially stacked between an upper plate 301 and a lower plate 302, and the stacked structures are incorporated by a bolt 105a and a nut 105b.

As shown in FIG. 9, a plurality of throughholes 201a and 202a corresponding to first anodes and cathodes 121 and 131 and second anodes and cathodes 122 and 132 disposed on upper and lower surfaces, that is, on first and second surfaces, of the ion exchange membrane 101, respectively, are formed on the upper and lower gaskets 201 and 202.

As shown in FIGS. 8 and 9, a plurality of rectangular perforated fuel supply regions 301a (corresponding to the fuel passage regions 151a of the first anode current collectors ISI) are formed on the upper plate 301 in a row, and a plurality of air supply regions 303 having a plurality of air supply holes 303a (corresponding to the air passage regions 152a of the first cathode current collectors 152) are formed thereon to be parallel with the fuel supply regions 301a.

Figure 10:
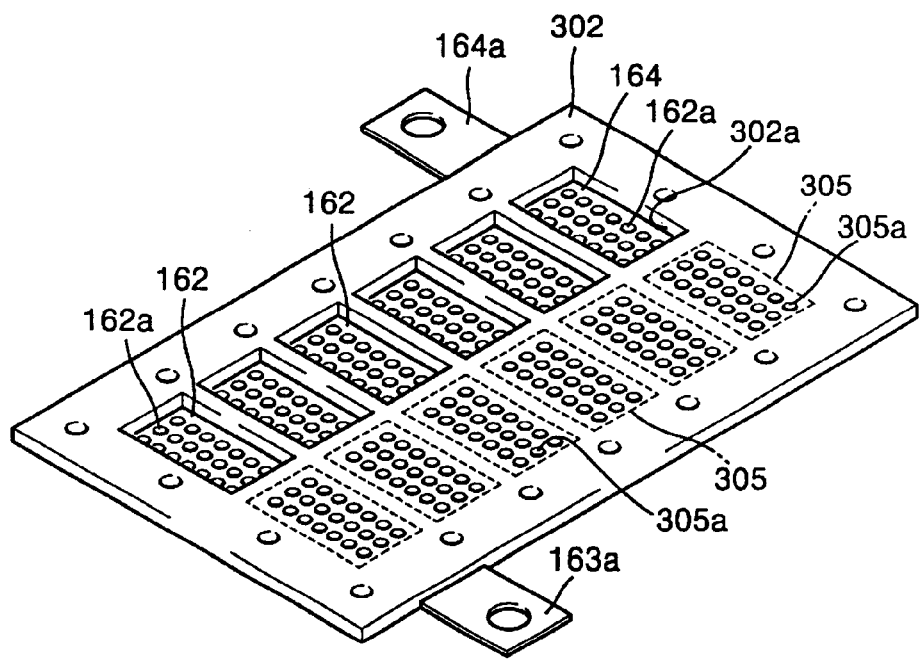
FIG. 10 is a perspective view of a lower plate employed in a monopolar cell pack for a DMFC according to the present invention.

As shown in FIG. 10, a plurality of fuel supply regions 302a and a plurality of air supply regions 305 having the same configuration as described above are formed on the bottom surface of the lower plate 302. The fuel supply regions 302a of the lower plate 302 are rectangular throughholes which correspond to the fuel passage regions 161a of the second anode current collectors 161 installed on the second surface of the ion exchange membrane 101. The respective air supply regions 305 having a plurality of air supply holes 305a correspond to the air passage regions 162a of the second cathode current collector 162.

Figure 11:
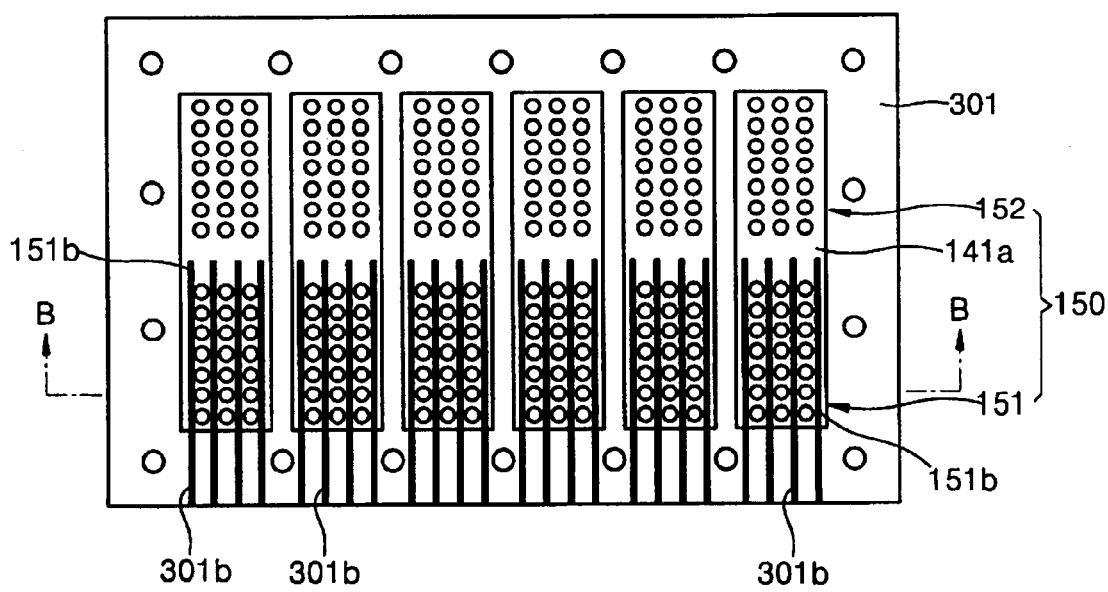
FIG. 11 is a plan view showing the inner surface of an upper plate employed in a monopolar cell pack for a DMFC according to the present invention.
Figure 12:
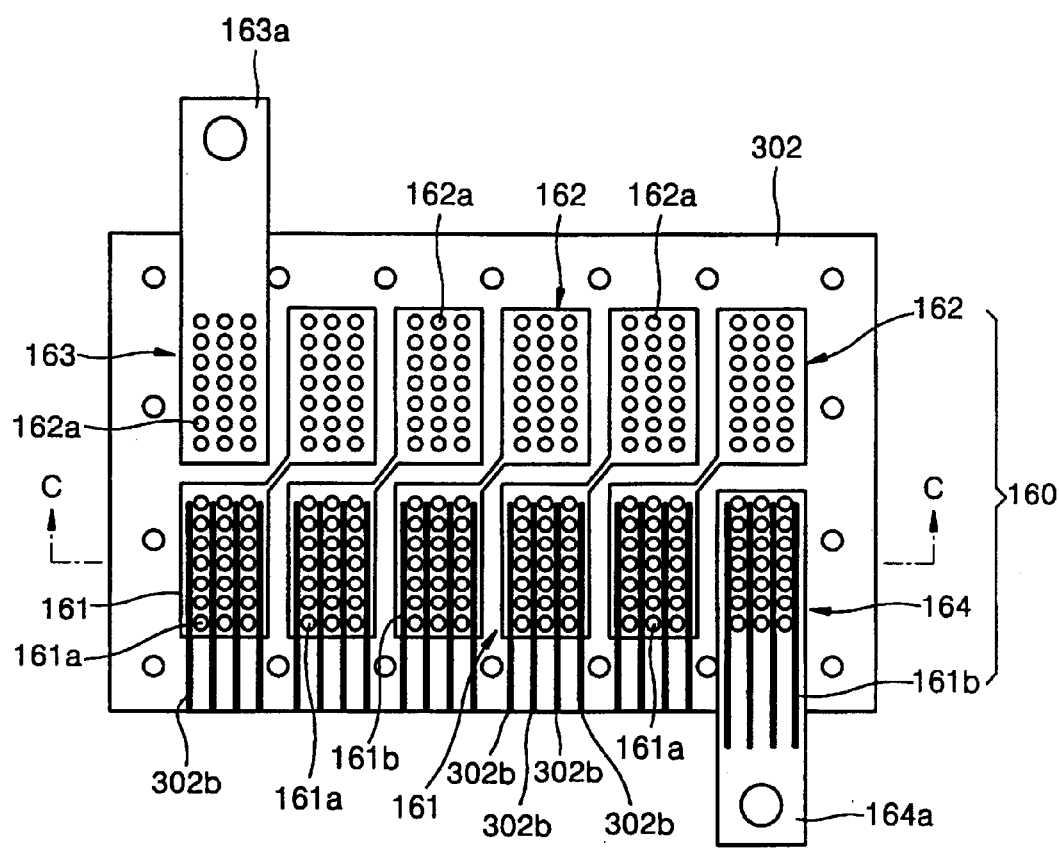
FIG. 12 is a plan view showing the inner surface of a lower plate employed in a monopolar cell pack for a DMFC according to the present invention.
Figure 13:
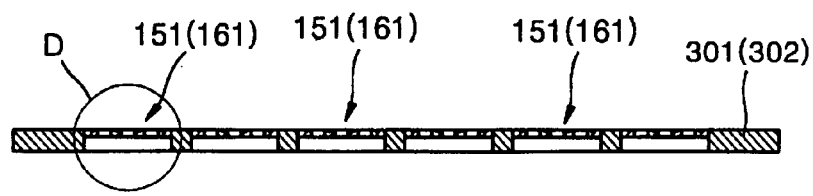
FIG. 13 is a sectional view taken along the line B—B of FIG. 11 and the line C—C of FIG. 12.
Figure 14:
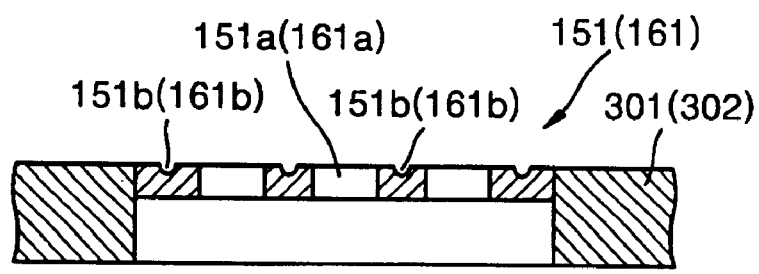
FIG. 14 is an enlarged view of a portion "D" shown in FIG. 13.

FIG. 11 is a plan view showing the inner surface of an upper plate employed in a monopolar cell pack for a DMFC according to the present invention, FIG. 12 is a plan view showing the inner surface of a lower plate employed in a monopolar cell pack for a DMFC according to the present invention, FIG. 13 is a sectional view taken along the line B—B of FIG. 11 and the line C—C of FIG. 12, and FIG. 14 is an enlarged view of a portion "D" shown in FIG. 13.

Referring to FIGS. 11 and 12, a plurality of first current collecting members 150 and a plurality of second current collecting members 160 formed in the respective inner parts of the upper and lower plates 301 and 302 are combined to be parallel with each other.

As shown in FIGS. 11 and 12, first gas exhaust channels 151b and 161b extend lengthwise on the surfaces of the first and second anode current collectors 151 and 161 of the first and second current collecting members 150 and 160. Also, second gas exhaust channels 301b and 302b connected to the first gas exhaust channels 151b and 161b are formed at edges of the upper and lower plates 301 and 302. The first gas exhaust channels 151b and 161b are formed on the inner surfaces of the first and second anode current collectors 151 and 161 contacting the first and second anodes 121 and 122. The second gas exhaust channels 301b and 302b exhaust $CO_2$ gas, which is a byproduct generated from the first and second anodes 121 and 122.

The first gas exhaust channels 151b and 161b are formed between the fuel supply regions 151a and 161a of the first and second anode current collectors 151 and 161.

As shown in FIGS. 13 and 14, the first and second anode current collectors 151 and 161 are inserted into the inner surfaces of the upper and lower plates 301 and 302 so that the surfaces thereof are coplanar with the inner surfaces of the upper and lower plates 301 and 302.

Figure 15:
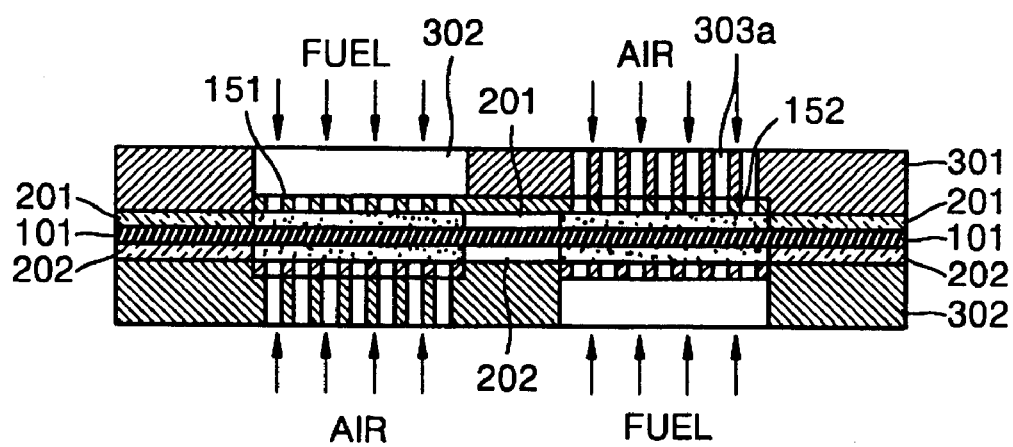
FIG. 15 is a sectional view of the monopolar fuel cell shown in FIG. 8, taken along the line E—E.

FIG. 15 is a sectional view of the monopolar fuel cell shown in FIG. 8, taken along the line E—E, and dimensions are exaggerated for better understanding.

Referring to FIG. 15, an upper gasket 201, an ion exchange membrane 101 and a lower gasket 202 are adhered to each other between the upper and lower plates 301 and 302. The upper gasket 201 and the lower gasket 202 hermetically seal edges of the first anodes and cathodes 121 and 131 disposed on the first surface of the ion exchange membrane 101 and seal edges of the second anodes and cathodes 122 and 132 disposed on the second surface of the ion exchange membrane 101. The first anodes 121 and cathodes 131 are adhered to the first anode and cathode current collectors 151 and 152 of the first current collecting member 150, and the second anodes and cathodes 122 and 132 are adhered to the second anode and cathode current collectors 161 and 162 of the second current collecting member 160. The fuel, e.g., methanol or ethanol, is supplied to the first and second anodes 121 and 122 through the fuel supply regions 302 and 302a of the upper and lower plates 301 and 302. The air is supplied to the first and second cathodes 131 and 132 through the air supply holes 303a and 305a of the air supply regions 303 and 305 of the upper and lower plates 301 and 302.

Figure 16:
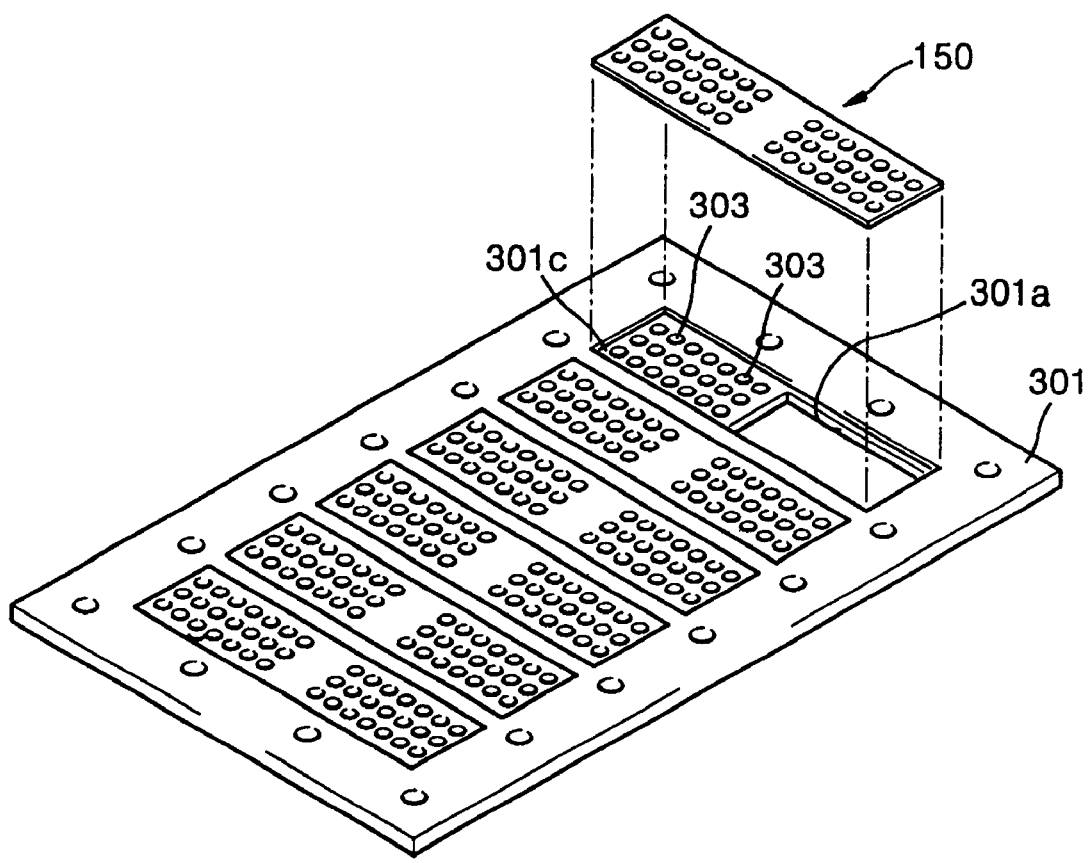
FIGS. 16 and 17 are perspective views showing the inner surface of each of first and second current collecting members 150 and 160 where an upper plate 301 and a lower plate 302 are installed, respectively.
Figure 17:
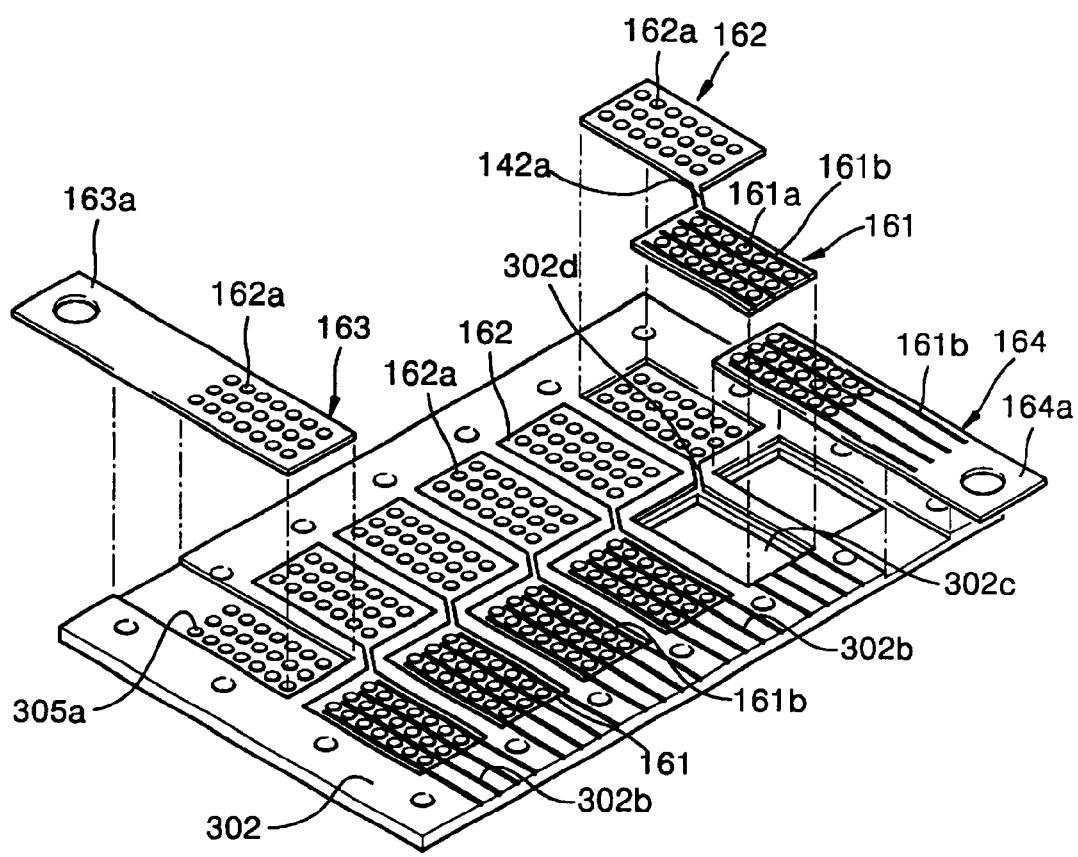

FIGS. 16 and 17 are perspective views showing the inner surface of each of first and second current collecting members 150 and 160 where the upper and lower plates 301 and 302 are installed, respectively. As shown in FIGS. 16 and 17, the first and second current collecting members 150 and 160 are inserted into insertion grooves 301c and 302c such that the respective surfaces of the first and second current collecting members 150 and 160 are formed to be coplanar with respect to the inner surfaces of the upper and lower plates 301 and 302. Also, a conductive portion insertion groove 302d into which a second conductive portion 142a which electrically connects the integrally formed second anode and cathode current collectors 161 and 162 of the second current collecting member 160 is inserted, is formed in the lower plate 302.

Preparation Process of Parts Constituting a Cell

Preparation of Anode and Cathode

A fuel diffusion layer was prepared by squeezing slurry produced by mixing carbon black, IPA (isopropanol) and 60 wt % of PTFE (polytetrafluoreoethylene) on waterproof carbon paper, and then dried in an oven kept at approximately 120° C. for 2 hours. Catalyst slurry was prepared by mixing a PtRu black catalyst (for anode) or a Pt black catalyst (for cathode), an IPA solution and 5% Nafion solution and subjecting the mixture to ultrasonic treatment for homogenous dispersion. The homogenously dispersed catalyst slurry was squeezed onto the fuel diffusion layer, dried in an oven kept at approximately 80° C. for 2 hours, thereby preparing anode and cathode electrodes.

Preparation of Membrane/Electrode

A Nafion 115 membrane was used as an electrolyte membrane, pretreated with $H_2SO_4$ and $H_2O_2$ and then dried with a gel-drier. Each of the anode and cathode electrodes was cut into a size of 2×1 $cm^2$, each 6 sheets of the cut electrodes were arranged on one surface of the electrolyte membrane in two rows and pairs of an anode and a cathode were arranged on the other surface of the electrolyte membrane.

Then, the resultant structure was hot-pressed at 125° C. with 9 Metric tons for 5 minutes, thereby preparing a 12-cell MEA.

Preparation of a Cell Pack and Test Thereof

A 12-cell MEA was placed in a cell pack having an electric circuit formed by current collectors and tightened with a bolt, thereby completing the cell pack. Fuel was supplied from a fuel storage through wicking and oxygen was supplied through air supply holes of current collectors contacting electrodes. The cell pack operates at room temperature and atmospheric pressure in an air-breathing manner without an additional blower. The electrochemical properties and performance of the cell pack were measured using a Potentiostat/Galvanostat.

Figure 18:
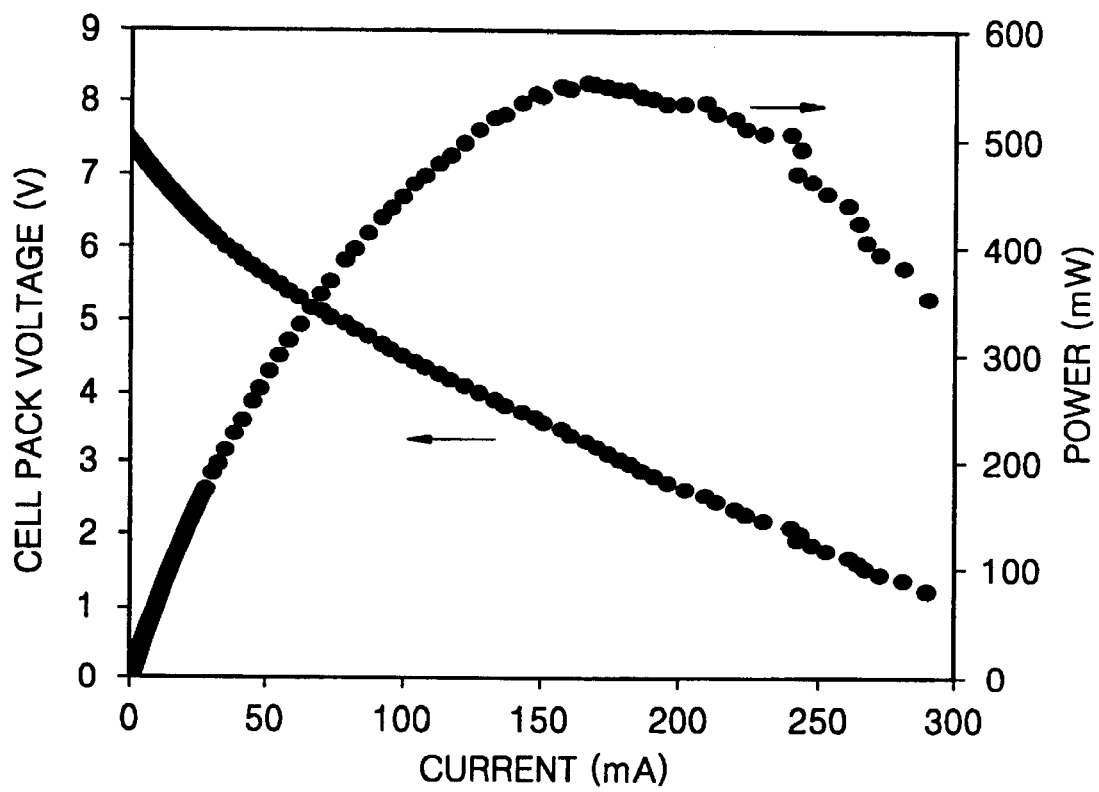
FIG. 18 is a graph showing the performance of a monopolar cell pack for a DMFC according to the present invention.

FIG. 18 is a graph showing the performance of a monopolar cell pack for a DMFC according to the present invention, the monopolar cell pack prepared by stacking 12 sheets of 2×1 cm sized electrodes on first and second surfaces of the ion exchange membrane. Here, 5 M methanol was used as the fuel and the operation conditions were room temperature, atmospheric pressure and an air-breathing manner. The maximum performance of the cell pack was 150 mA (75 mA/$cm^2$) at 3.6 V (0.3 V per cell) and the highest power output of 551 mW was exhibited at 3.3 V.

In the conventional monopolar cell pack, leakage of liquid fuel may occur because electrical connecting members for connecting single cells pass through an ion exchange membrane. However, according to the present invention, series-connection of electrodes makes it unnecessary for connections to pass through an electrolyte membrane and allows single cells to be electrically connected on the first and second surfaces of the ion exchange membrane, respectively, thereby preventing leakage of fuel. As a result, the internal electric circuit according to the present invention can be simplified. Also, since current collectors contact the anodes and cathodes entirely rather than partially, contact resistance can be considerably reduced, thereby greatly reducing a loss due to resistance. Carbon dioxide, which is a byproduct of the reaction, can be easily exhausted through an exhaust path installed in each current collector, thereby improving performance of a cell pack.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A monopolar cell pack for a direct methanol fuel cell comprising:
   an upper plate and a lower plate spaced a predetermined distance apart from each other;
   an ion exchange membrane provided between the upper plate and the lower plate, having a first surface and a second surface corresponding to the first surface and having a plurality of single cell regions on the first and second surfaces;
   a plurality of first anodes installed in each single cell region on the first surface of the ion exchange membrane and a plurality of first cathodes disposed in each single cell region adjacent to each of the anodes;
   a plurality of second cathodes installed in each single cell region on the second surface of the ion exchange membrane, the second cathodes corresponding to the first anodes, and a plurality of second anodes corresponding to the first cathodes;
   first and second anode current collectors installed on the first and second anodes and each having a fuel passage region;
   first and second cathode current collectors installed on the first and second cathodes and each having an air passage region;
   a plurality of first conductive portions electrically connecting the first anode and cathode adjacent to each other on the first surface of the ion exchange membrane; and
   a plurality of second conductive portions electrically connecting the second anode and cathode adjacent to each other on the second surface of the ion exchange membrane to electrically connect in series cells provided in the single cell regions.

2. The monopolar cell pack of claim 1, wherein fuel supply regions for supplying fuel to the first and second anodes, and air supply regions for supplying air to the first and second cathodes, are provided on the upper and lower plates.

3. The monopolar cell pack of claim 2, wherein the first and second anode current collectors corresponding to the first and second anodes and cathodes have a size corresponding to that of each of the fuel supply regions provided on the upper and lower plates, and the first and second cathode current collectors have a size corresponding to that of each of the air supply regions provided on the upper and lower plates.

4. The monopolar cell pack of claim 1, wherein the first conductive portion is integrally formed with each of the first anodes disposed on the first surface of the ion exchange membrane and the first cathode electrically connected thereto.

5. The monopolar cell pack of claim 2, wherein the first conductive portion is integrally formed with each of the first anodes disposed on the first surface of the ion exchange membrane and the first cathode electrically connected thereto.

6. The monopolar cell pack of claim 3, wherein the first conductive portion is integrally formed with each of the first anodes disposed on the first surface of the ion exchange membrane and the first cathode electrically connected thereto.

7. The monopolar cell pack of claim 1, wherein the second conductive portion is integrally formed with each of the second anodes disposed on the second surface of the ion exchange membrane and the second cathode electrically connected thereto.

8. The monopolar cell pack of claim 2, wherein the second conductive portion is integrally formed with each of the second anodes disposed on the second surface of the ion exchange membrane and the second cathode electrically connected thereto.

9. The monopolar cell pack of claim 3, wherein the second conductive portion is integrally formed with each of the second anodes disposed on the second surface of the ion exchange membrane and the second cathode electrically connected thereto.

10. The monopolar cell pack of claim 4, wherein the second conductive portion is integrally formed with each of the second anodes disposed on the second surface of the ion exchange membrane and the second cathode electrically connected thereto.

11. The monopolar cell pack of claim 5, wherein the second conductive portion is integrally formed with each of the second anodes disposed on the second surface of the ion exchange membrane and the second cathode electrically connected thereto.

12. The monopolar cell pack of claim 6, wherein the second conductive portion is integrally formed with each of the second anodes disposed on the second surface of the ion exchange membrane and the second cathode electrically connected thereto.

13. The monopolar cell pack of claim 1, wherein current collector insertion grooves into which first current collecting members are inserted are formed on the inner surface of the upper plate.

14. The monopolar cell pack of claim 2, wherein current collector insertion grooves into which first current collecting members are inserted are formed on the inner surface of the upper plate.

15. The monopolar cell pack of claim 3, wherein current collector insertion grooves into which first current collecting members are inserted are formed on the inner surface of the upper plate.

16. The monopolar cell pack of claim 10, wherein current collector insertion grooves into which first current collecting members are inserted are formed on the inner surface of the upper plate.

17. The monopolar cell pack of claim 11, wherein current collector insertion grooves into which first current collecting members are inserted are formed on the inner surface of the upper plate.

18. The monopolar cell pack of claim 12, wherein current collector insertion grooves into which first current collecting members are inserted are formed on the inner surface of the upper plate.

19. The monopolar cell pack of claim 1, wherein current collector insertion grooves into which second anode and cathode current collectors are inserted are formed on the inner surface of the lower plate, and conductive portion insertion grooves into which the second conductive portions are inserted are formed on the inner surface of the lower plate.

20. The monopolar cell pack of claim 2, wherein current collector insertion grooves into which second anode and cathode current collectors are inserted are formed on the inner surface of the lower plate, and conductive portion insertion grooves into which the second conductive portions are inserted are formed on the inner surface of the lower plate.

21. The monopolar cell pack of claim 3, wherein current collector insertion grooves into which second anode and cathode current collectors are inserted are formed on the inner surface of the lower plate, and conductive portion insertion grooves into which the second conductive portions are inserted are formed on the inner surface of the lower plate.

22. The monopolar cell pack of claim 10, wherein current collector insertion grooves into which second anode and cathode current collectors are inserted are formed on the inner surface of the lower plate, and conductive portion insertion grooves into which the second conductive portions are inserted are formed on the inner surface of the lower plate.

23. The monopolar cell pack of claim 11, wherein current collector insertion grooves into which second anode and cathode current collectors are inserted are formed on the inner surface of the lower plate, and conductive portion insertion grooves into which the second conductive portions are inserted are formed on the inner surface of the lower plate.

24. The monopolar cell pack of claim 12, wherein current collector insertion grooves into which second anode and cathode current collectors are inserted are formed on the inner surface of the lower plate and conductive portion insertion grooves into which the second conductive portions are inserted, are formed on the inner surface of the lower plate.

25. The monopolar cell pack of claim 1, wherein a plurality of first gas exhaust channels for exhausting byproducts generated at the first and second anodes are formed on the inner surfaces of the first and second anode current collectors, and a plurality of second gas exhaust channels connected to the first gas exhaust channels are formed on the inner surfaces of the upper and lower plates.

26. The monopolar cell pack of claim 2, wherein a plurality of first gas exhaust channels for exhausting byproducts generated at the first and second anodes are formed on the inner surfaces of the first and second anode current collectors, and a plurality of second gas exhaust channels connected to the first gas exhaust channels are formed on the inner surfaces of the upper and lower plates.

27. The monopolar cell pack of claim 3, wherein a plurality of first gas exhaust channels for exhausting byproducts generated at the first and second anodes are formed on the inner surfaces of the first and second anode current collectors, and a plurality of second gas exhaust channels connected to the first gas exhaust channels are formed on the inner surfaces of the upper and lower plates.

28. The monopolar cell pack of claim 10, wherein a plurality of first gas exhaust channels for exhausting byproducts generated at the first and second anodes are formed on the inner surfaces of the first and second anode current collectors, and a plurality of second gas exhaust channels connected to the first gas exhaust channels are formed on the inner surfaces of the upper and lower plates.

29. The monopolar cell pack of claim 11, wherein a plurality of first gas exhaust channels for exhausting byproducts generated at the first and second anodes are formed on the inner surfaces of the first and second anode current collectors, and a plurality of second gas exhaust channels connected to the first gas exhaust channels are formed on the inner surfaces of the upper and lower plates.

30. The monopolar cell pack of claim 12, wherein a plurality of first gas exhaust channels for exhausting byproducts generated at the first and second anodes are formed on the inner surfaces of the first and second anode current collectors, and a plurality of second gas exhaust channels connected to the first gas exhaust channels are formed on the inner surfaces of the upper and lower plates.

31. The monopolar cell pack of claim 1, wherein an upper gasket and a lower gasket having throughholes corresponding to the first and second anodes and cathodes are installed between the upper plate and the ion exchange membrane and between the lower plate and the ion exchange membrane.

32. The monopolar cell pack of claim 2, wherein an upper gasket and a lower gasket having throughholes corresponding to the first and second anodes and cathodes are installed between the upper plate and the ion exchange membrane and between the lower plate and the ion exchange membrane.

33. The monopolar cell pack of claim 3, wherein an upper gasket and a lower gasket having throughholes corresponding to the first and second anodes and cathodes are installed between the upper plate and the ion exchange membrane and between the lower plate and the ion exchange membrane.

34. The monopolar cell pack of claim 10, wherein an upper gasket and a lower gasket having throughholes corresponding to the first and second anodes and cathodes are installed between the upper plate and the ion exchange membrane and between the lower plate and the ion exchange membrane.

35. The monopolar cell pack of claim 11, wherein an upper gasket and a lower gasket having throughholes corresponding to the first and second anodes and cathodes are installed between the upper plate and the ion exchange membrane and between the lower plate and the ion exchange membrane.

36. The monopolar cell pack of claim 12, wherein an upper gasket and a lower gasket having throughholes corresponding to the first and second anodes and cathodes are installed between the upper plate and the ion exchange membrane and between the lower plate and the ion exchange membrane.

* * * * *